Figure 1:
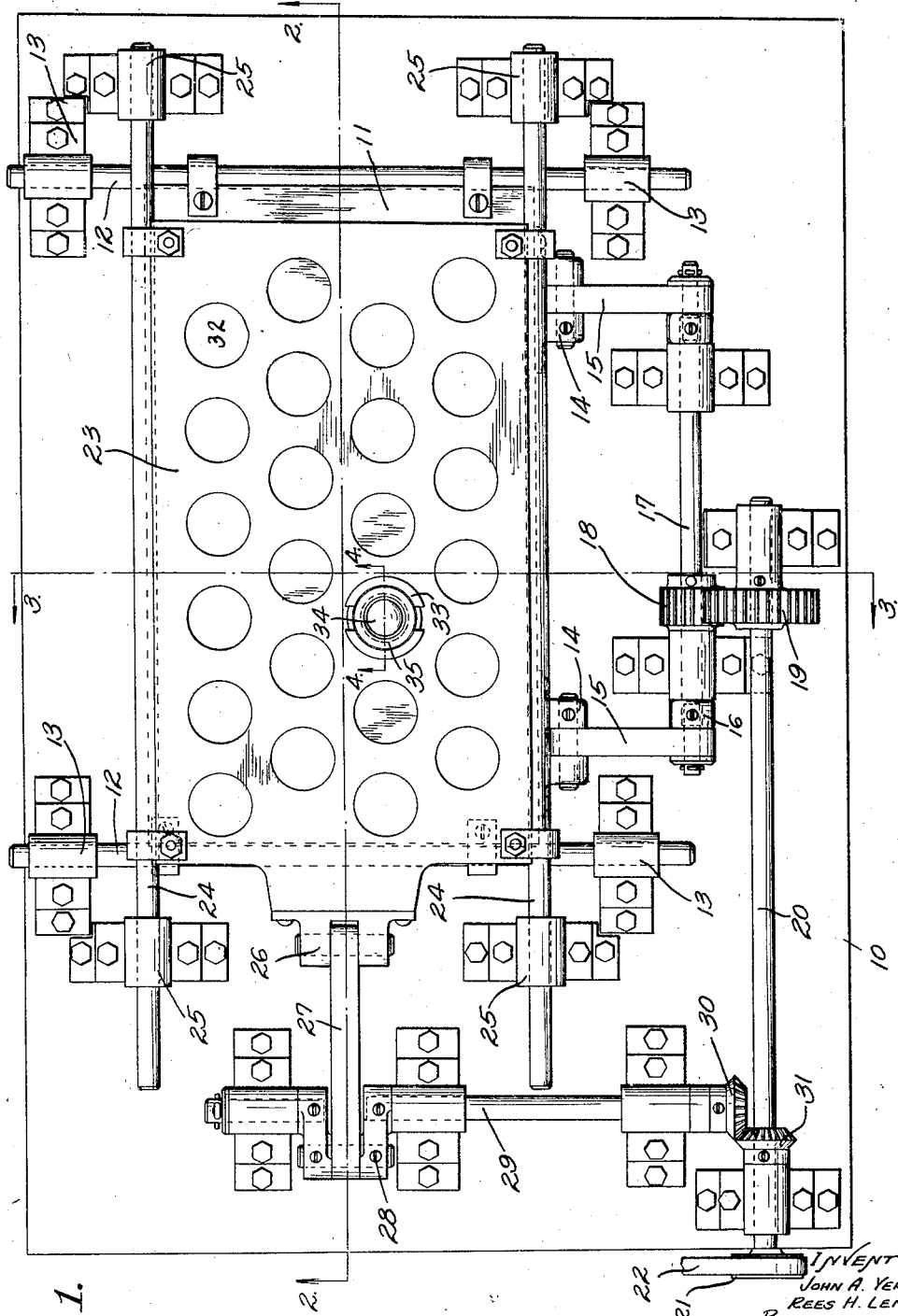

Sept. 18, 1928.

J. A. YERKES ET AL 1,684,854

VALVE SEAT GRINDING MACHINE

Filed Nov. 28, 1927  2 Sheets-Sheet 1

INVENTORS
JOHN A. YERKES
REES H. LEMMON
By
Westall and Wallace
ATTORNEYS

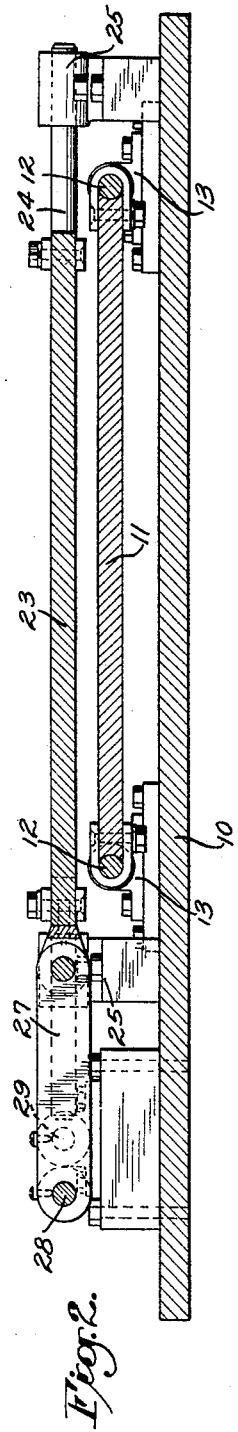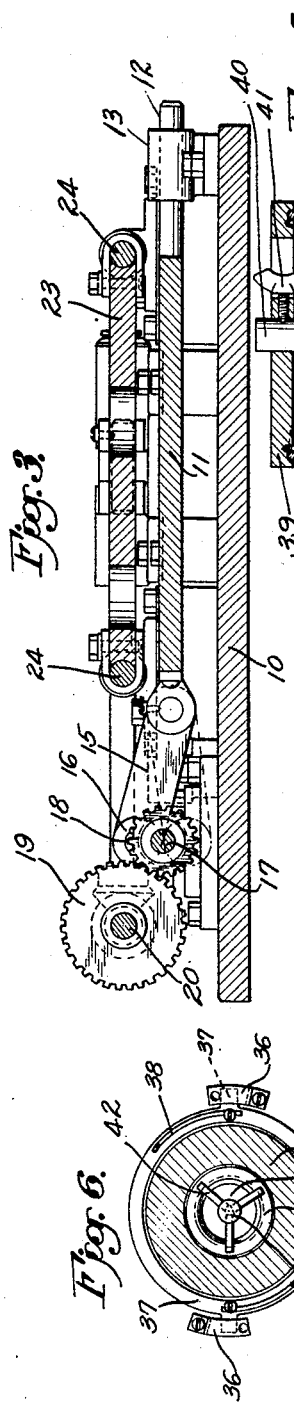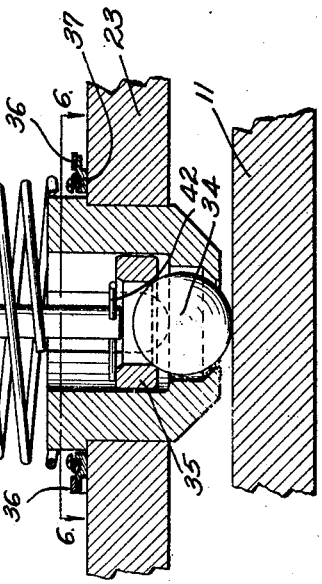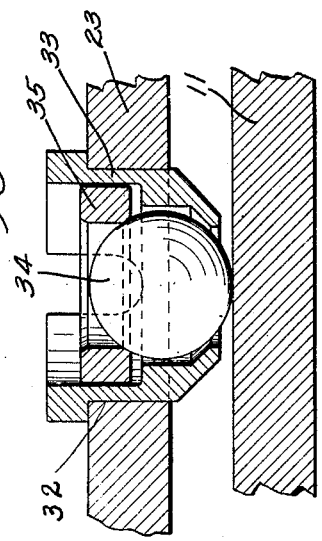

Patented Sept. 18, 1928.

1,684,854

UNITED STATES PATENT OFFICE.

JOHN A. YERKES AND REES H. LEMMON, OF LONG BEACH, CALIFORNIA.

VALVE-SEAT-GRINDING MACHINE.

Application filed November 28, 1927. Serial No. 236,069.

This invention relates to a machine for grinding ball valve seats or like articles, and is especially adaptable to grinding well pump valve seats employing ball checks. Heretofore, it has been the current practice to grind seats by affixing a seat to a rotating member such as a shaft, and holding a single ball against the same using any suitable abrasive or grinding compound. This is a laborious, slow and expensive process.

The present invention has for its objects, first the provision of a machine for grinding a plurality of seats at one operation and employing the balls for that purpose: second, to provide a machine which will roll the balls about ever-changing axes upon the seats; third, to provide a plate or support for the balls to roll upon and an opposing carrier for the seats which latter ride upon the balls; fourth, to so move the carrier and plate with respect to one another as to provide a path for each ball which does not repeat and thereby to maintain the plate so that it may wear uniformly; and fifth, to provide a machine which is simple in structure, efficient, requires substantially no attention during its operation and is susceptible of being designed to accommodate a multiplicity of seats.

These objects together with other objects and corresponding accomplishments are obtained by means of the embodiment of our invention illustrated in the accompanying drawing, in which:

Fig. 1 is a plan view of a complete machine; Fig. 2 is longitudinal section as seen upon the line 2—2 of Fig. 1; Fig. 3 is a transverse section as seen upon the line 3—3 of Fig. 1; Fig. 4 is a section on an enlarged scale of a cage for a ball and its seat on an enlarged scale; Fig. 5 is a section as seen on the line 4—4 of Fig. 1 through a cage of a modified form; and Fig. 6 is a section on the line 6—6 of Fig. 5.

Referring with more particularity to the drawing, 10 indicates a bed plate. Mounted to reciprocate on the bed plate is a base plate or support 11. The base plate has rods 12 secured to opposite edges thereon arranged to slide in eye blocks 13 mounted upon the bed. Secured to one edge of the base plate are two pairs of ears 14 to which are pivotally secured connecting rods 15. Connecting rods 15 are journalled upon crank arms 16 mounted upon a shaft 17. Fixed to the shaft is a pinion 18 meshing with a gear 19 on drive shaft 20. The drive shaft is mounted in suitable bearings and has a pulley 21 operated by a belt 22. Obviously, upon rotation of the drive shaft, the plate 11 will be reciprocated.

Mounted over base plate 11 and spaced therefrom is a carriage 23. Carriage 23 has slide rods 24 secured to opposite edges, and bearing eyes 25 therefor secured to the bed plate. Outstanding from one edge is a bracket 26. Pivotally secured to the bracket 26 by a pivot pin is a connecting rod 27 which is journalled upon a crank 28. Crank 28 is revolved by a shaft 29 mounted in suitable bearings and carrying a bevel gear 30 at one end. On drive shaft 20 is a bevel gear 31 meshed with bevel gear 30. It will be noted that gear 19 is of a larger diameter than bevel gear 31. Upon rotation of the drive shaft, the carriage will be reciprocated transversely of the base plate. However, the speed or frequency at which the carriage reciprocates is less than that of the base plate. This is attained by use of proper sizes of gears. There are a multiplicity of circular openings 32 in the carriage adapted to receive cages 33. The cages have chambers so that a ball indicated by 34 may be housed therein and projected beyond the bottom of the cage. This will permit it to ride upon the base plate 11. Floating within the cage is the valve seat for the cage indicated by 35. The seat rests or floats upon the ball.

The carriage is loaded with balls and their seats. A grinding compound of an abrasive nature is then fed into the cage and the reciprocation of the carriage and plates begun. The balls will be turned in all directions. Each ball rides over the base plate in a figure 8, but due to the differences in frequencies of the carriage and plates, the balls do not track. This avoids wearing of tracks in the base plate, and insures the balls being turned over in all directions. With the larger seats, the weight of a seat is sufficient to urge the latter with enough force against the ball to produce effective grinding. In the smaller sizes, it may be necessary to weight the seats. This may be done by placing another seat over the one which is being ground.

It is also within the scope of our invention to provide an independent means for urging the seats against the balls. In Figs. 5 and 6, such a device has been shown. On the carriage at each side of an opening therein are spring clips 36 having openings facing in opposite directions, so that the tongues 37 on a collar may be slipped thereunder to lock the collar in position. Fixed to the collar is a compression spring 38. Mounted on the top of the spring is a spider 39 to which a stem 40 is secured by means of a screw 41 or any other suitable fastening means. At the bottom of the stem is a spider 42 arranged to engage the seat 35 which is to be ground and rests upon the ball 34. By this means a positive pressure is exerted upon the seat. However, some manipulation will be required in order to place the ball and seat in position so that the spring acts upon the two members.

What we claim is:

1. A valve seat grinding machine comprising an oppositely faced plate and carriage, said plate and carriage being movable transversely of one another, means in said carriage for accommodating one of the members of a ball and seat or the like and whereby said member is urged toward said plate, said plate supporting the other member of said ball and seat, and means to move said carriage and plate relative to one another in recurring cycles.

2. A valve seat grinding machine comprising an oppositely faced plate and carriage, said plate and carriage being movable transversely of one another, means in said carriage for accommodating one of the members of a ball and seat and whereby said member is urged toward said plate, said plate supporting the other member of said ball and seat, and means to reciprocate said carriage and plate relative to one another.

3. A valve grinding machine comprising an oppositely faced plate and carriage, said carriage and plate being movable transversely of one another, cages in said carriage to accommodate balls and to float seats on said balls whereby said seats are urged against said balls, and means to reciprocate said carriage and plate relative to one another including connecting rods and cranks.

4. A valve grinding machine comprising an oppositely faced plate and carriage, said carriage and plate being movable transversely of one another, cages in said carriage to accommodate balls and to float seats on said balls whereby said seats are urged against said balls, and means to reciprocate said carriage and plate relative to one another including connecting rods, cranks and gearing operating said cranks at different angular speeds.

5. A machine of the class described comprising an oppositely faced support and carriage, means to cause relative movement between said support and carriage in two directions, means in said carriage for accommodating a multiplicity of the like members of balls and seats and whereby said members are urged toward one another and said balls are caused to rotate about constantly changing polar axes.

6. A machine of the class described comprising an oppositely faced support and carriage, said carriage and support being movable transversely of one another, cages in said carriage to accommodate balls and to float seats on said balls whereby said seats are urged against said balls, and means to move said carriage and support relative to one another in recurring cycles.

In witness that we claim the foregoing we have hereunto subscribed our names this 7th day of November, 1927.

REES H. LEMMON.
JOHN A. YERKES.